United States Patent [19]

Wessel et al.

[11] Patent Number: 5,053,914
[45] Date of Patent: Oct. 1, 1991

[54] SAFETY CIRCUIT FOR A HIGH-VOLTAGE GENERATOR OF AN ELECTROSTATIC FILTER

[75] Inventors: Wolf Wessel, Oberriexingen; Werner Fischer, Heimsheim; Rolf Leonhard, Schwieberdingen; Wilhelm Polach, Moeglingen; Bernhard Lucas, Weissach; Wilhelm Stahl, Laichingen, all of Fed. Rep. of Germany

[73] Assignee: Robert Bosch GmbH, Stuttgart, Fed. Rep. of Germany

[21] Appl. No.: 449,836

[22] PCT Filed: Feb. 2, 1989

[86] PCT No.: PCT/DE89/00063
§ 371 Date: Dec. 8, 1989
§ 102(e) Date: Dec. 8, 1989

[87] PCT Pub. No.: WO89/11338
PCT Pub. Date: Nov. 30, 1989

[30] Foreign Application Priority Data

May 24, 1988 [DE] Fed. Rep. of Germany ....... 3817506

[51] Int. Cl.[5] .................... B03C 3/72; B03C 3/68; F01N 3/02; H02H 11/00
[52] U.S. Cl. .................... 361/235; 55/105; 55/DIG. 30; 60/275
[58] Field of Search .................. 361/45, 46, 49, 50, 361/213, 229–231, 235, 233; 60/275, 277; 55/104, 105, 139, DIG. 30; 340/652; 324/503, 509, 510; 307/10.1, 326, 130, 131, 154

[56] References Cited

U.S. PATENT DOCUMENTS

| | | | |
|---|---|---|---|
| 4,011,483 | 3/1977 | Meadows | 361/47 |
| 4,023,073 | 5/1977 | Georgi | 361/45 |
| 4,075,675 | 2/1978 | Burkett et al. | 361/48 |
| 4,338,784 | 7/1982 | Liu et al. | 60/274 |
| 4,447,844 | 5/1984 | Schossow et al. | 361/77 |
| 4,506,260 | 3/1985 | Woodruff et al. | 340/649 |
| 4,860,149 | 8/1989 | Johnston | 361/79 |

Primary Examiner—A. D. Pellinen
Assistant Examiner—David Osborn
Attorney, Agent, or Firm—Michael J. Striker

[57] ABSTRACT

A safety circuit arrangement for the high-voltage generator of an electrostatic filter, in particular of an electrostatic soot trap for diesel internal-combustion engines including a grounded filter housing and a filter electrode, has a power supply (15) which is connected to the high voltage generator (20) via controllable switching means (34). A and a shielded high-voltage cable (17), the high-voltage line (18) of which connects an output (24) of the high-voltage generator (20) to the filter electrode (14). To eliminate the risk to people caused by components carrying high voltage, the shield (19) of the high-voltage cable (17) is connected at one end to the filter housing (11), and at the other end to a control device (25) in such a way that an interruption of the shield (19) leads to the generation of a control signal for the switching means.

15 Claims, 2 Drawing Sheets

SAFETY CIRCUIT FOR A HIGH-VOLTAGE GENERATOR OF AN ELECTROSTATIC FILTER

BACKGROUND OF THE INVENTION

The invention relates to a safety circuit arrangement for the high-voltage supply of an electrostatic filter, in particular of an electrostatic soot trap for diesel internal-combustion engines.

Electrostatic soot traps for diesel vehicles, also called soot filters, agglomerators or coagulators, are described, for example, in DE-A1-3 500 373 or DE-A1-3 424 196. In these prior art soot traps control devices with an output of up to 20 kV, 150 W and 10 mA are used for generating the high voltage required for creating the electrostatic field. A control device of this type for generating a high voltage is described, for example, in DE-A1-3 531 025. Owing to these control devices, there is a considerable risk potential for people in the case of improper use, or also with servicing and repair work on the vehicle, or in the case of an accident, so that preventative measures are necessary to avoid endangering people.

SUMMARY OF THE INVENTION

The object of the invention is a circuit arrangement for the high-voltage supply of an electrostatic filter in which the advantage that the high-voltage generation is switched off in the case of interruption of the ground connection between the control device and filter housing or filter housing and vehicle ground, with the resulting elimination of the risk of injury to people due to exposed components carrying high voltage.

In a first exemplary embodiment of the invention, the high-voltage generation is switched off by connecting the end of the shield of the high-voltage cable remote from the filter housing, or of the connecting line parallel thereto, via a resistor or a current source to a direct current potential, preferably ground, and by evaluating the voltage drop at the resistor or the current source as a switch-off criterion, for example for the active switching off of the power supply by a switching relay.

In a further embodiment of the invention, the end of the shield remote from the filter housing, or of the connecting line parallel thereto, serves as ground connection for the primary side of the high-voltage generator. If the ground connection of the primary side is interrupted, then the power supply to the primary side and hence the high-voltage generation is automatically stopped.

Since a shielded high-voltage cable is necessary anyway for carrying high voltage between high-voltage generator and filter for reasons of radio interference suppression, it is advantageous if the shield of the high-voltage cable is used as ground connection between high-voltage generator and filter. However, it is also possible to use a connecting line run parallel on the high-voltage cable, which connecting line is advantageously integrated in the high-voltage cable itself and runs, for example, in the outer sleeve thereof.

BRIEF DESCRIPTION OF THE DRAWINGS

The invention is explained in the description below in greater detail with reference to the exemplary embodiments illustrated in the drawings, in which, in diagrammatic representation.

DESCRIPTION OF THE PREFERRED EMBODIMENTS

Figure 1:
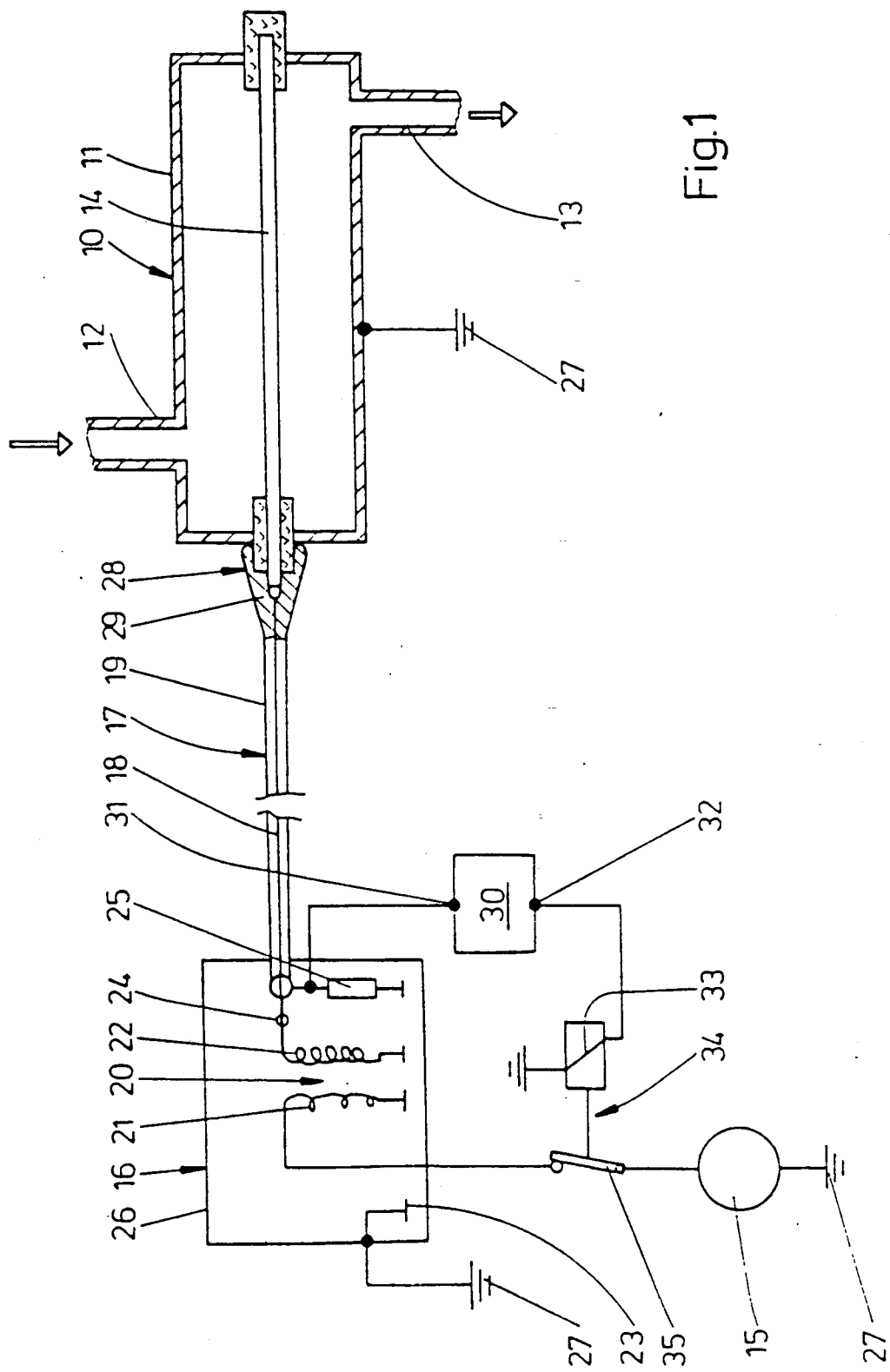
FIGS. 1 and 2 show, respectively, a first and a second embodiment of a circuit arrangement for the high-voltage supply of an electrostatic soot trap for a diesel vehicle.

The electrostatic soot trap 10, also called a coagulator, or agglomerator or soot filter for a diesel vehicle illustrated diagrammatically in FIG. 1 is known from prior art as an example of an electrostatic filter. It consists of a preferably cylindrical housing 11, which has a connecting piece 12 for intake and a connecting piece 13 for discharging exhaust gas. An electrode 14 is built in isolated fashion in the interior of the housing 11. A high voltage is supplied to the electrode 14, while the housing 11 serves as a counter-electrode and is connected to vehicle ground 27. As a consequence, there is formed between the electrode 14 and the housing 11 an electrostatic field in which the particles contained in the exhaust gas, for example soot particles, are ionized. In this process, electrical charges become attached to the particles, so that the soot particles coagulate, that is attract one another and combine to form larger agglomerates, which can be mechanically separated more readily in a non-illustrated centrifugal trap, a so-called cyclonic trap, connected to the connecting piece 13.

For the high-voltage supply of the soot trap 10, a safety circuit arrangement is provided which has a control device 16 enclosed in housing 26 and connected to a power supply 15. The control device 16 contains a high-voltage generator and power electronics (not shown) for controlling the high-voltage generator, and a shielded high-voltage cable 17 with a high-voltage line 18 and a shield 19 surrounding the latter coaxially. The high-voltage generator is designed as a DC-DC converter 20, as is described for example in DE-A1-3 531 025. This known DC-DC converter 20 is realized by an isolating transformer, for example, having a primary winding 21 and a secondary side 22. In this arrangement, the primary winding 21 is connected between a direct current source serving as the power supply 15, and an internal reference ground 23 of the control device 16, while the secondary side 22 lies between the high-voltage output 24 and the reference ground 23.

With its high-voltage line 18, the high-voltage cable 17 connects the high-voltage output 24 of the control device 16 to the electrode 14 of the soot trap 10. An end of the shield 19 projects into housing 26 of the control device 16 and is connected to the reference ground 23 via a resistor 25, while the other end of a solenoid 19 is connected to the housing 11 of the soot trap 10. Like the housing 26 of the control device 16 and the housing 11 of the soot trap 10, the reference ground 23 is connected to the vehicle ground 27, to which the ground terminal of the power supply 15 is also connected. To connect high-voltage cable 17 and soot trap 10, the high-voltage cable 17 ends with a cable connector 28, which has a an insulating connector sleeve 29 enclosing an end portion of the high-voltage line 18, and the corresponding end position of the shield 19 is led on the connector sleeve 29 such that when the high-voltage line 18 contacts the electrode 14 the shield 19 contacts the housing 11 of the soot trap 10. Connected in parallel to the resistor 25 is a voltage detection circuit 30, which is designed in such a way that it delivers a switch-off signal to its output 32 when a voltage difference occurs at its input 31. The output 32 of the voltage detection circuit 30 is—if appropriate after amplification—connected to the excitation winding 33 of a switching relay 34, the normally closed switching contact 35 of which controls the connection between the current source 15 and the primary winding 21 of the DC-DC converter 20. If the shield 19 or the connection between housing 11 of the soot trap 10 and the vehicle ground 27 is interrupted at any point, then a voltage drop occurs at the resistor 25 as a result of leakage currents present. As a result of this voltage drop, the voltage detection circuit 30 generates a switch-off signal, causing current to flow through the excitation winding 33 of the switching relay 34. The switching relay 34 responds and opens its switching contact 35, causing the voltage supply 15 to be disconnected from the control device 16.

Figure 2:
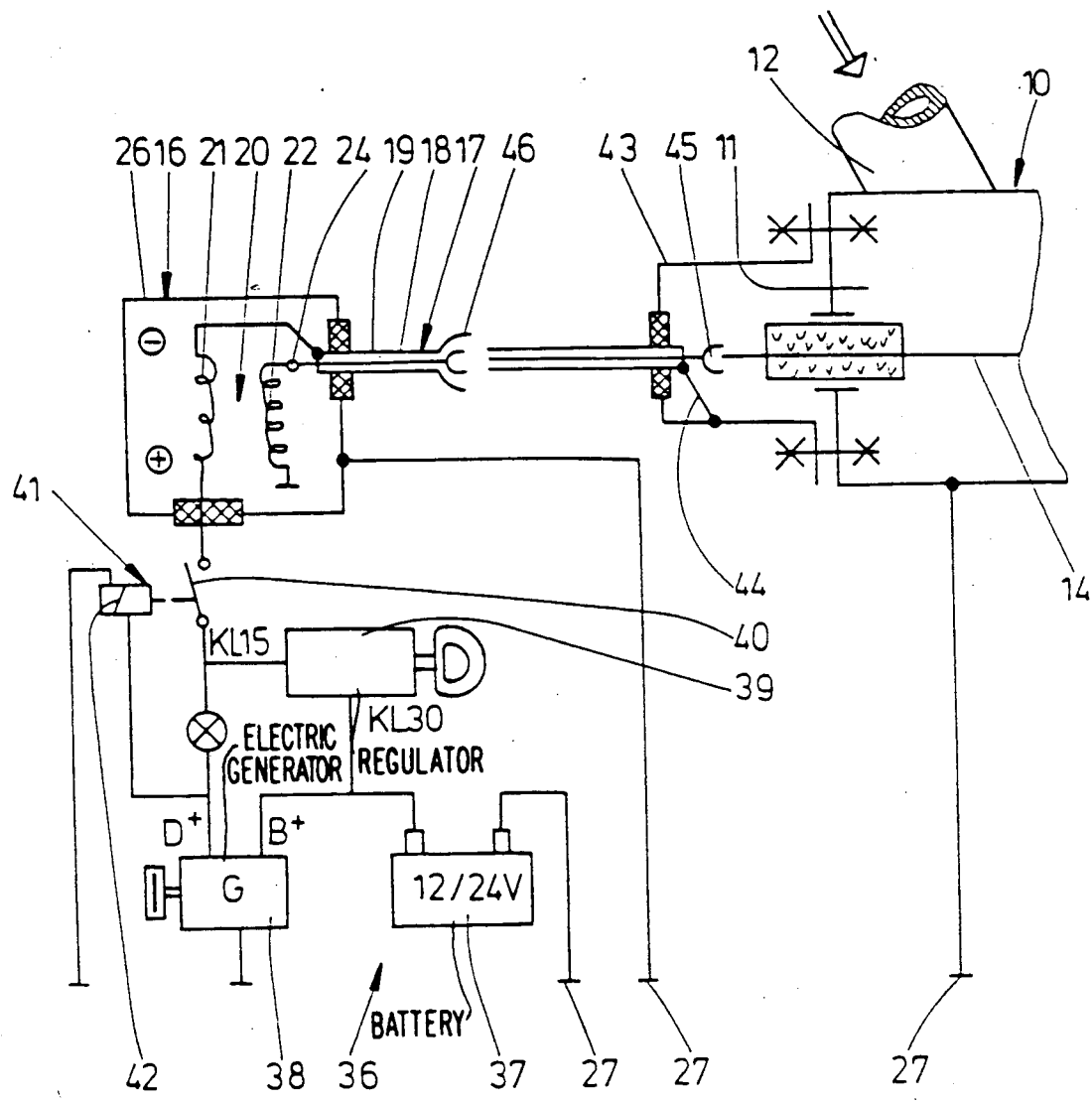

In the exemplary embodiment of the circuit arrangement diagrammatically illustrated in FIG. 2, the power supply for the control device 16 is taken from the power supply system 36 of the diesel vehicle. This power supply system 36 comprises in known manner the vehicle battery 37, electric generator 38 and the regulator 39. The normally open switching contact 40 of a switching relay 41 controls the connection between the power supply system 36 and the control device 16, to be precise an end of the primary winding 21. The excitation winding 42 of the switching relay is directly connected to the electric generator 38, as a result of which the switching relay 41 is only excited and the switching contact 40 closes when the electric generator 38 is driven, that is when the diesel engine is running. This ensures that the primary winding 21 of the control device 16 is only supplied with power when the engine is running.

As a variation of the circuit arrangement in FIG. 1, the other end of the primary winding 21 of the DC-DC converter 20 is not connected to an internal reference ground, but to the shield 19 of the high-voltage cable 17 extending between the control device 16 and soot trap 10. On the side of the soot trap 10, the shield 19 is again electrically connected via line 44 to a cap 43 of the housing 11 and to vehicle ground 27. The cap 43 encloses a connector 45, which is connected to the high-voltage line 18 and is plugged onto the electrode 14 of the soot trap 10. It is possible to provide a further intermediate connector 46 in the high-voltage cable 17 to avoid the dismounting of cap 43 and connector 45 for breaking the electrical connection between control device 16 and soot trap 10.

In this circuit arrangement, each break of the shield 19, for example by detaching the intermediate connector 46, dismounting the cap 43 or drawing out the high-voltage cable 17 from the cap 43 after unplugging the connector 45 from the electrode 14, leads to an interruption of the power supply for the control device 16 or for the DC-DC converter 20, so that a reliable shock protection of the parts carrying high voltage is provided even in the case of improper use or when components are destroyed as a result of an accident.

Figure 3:
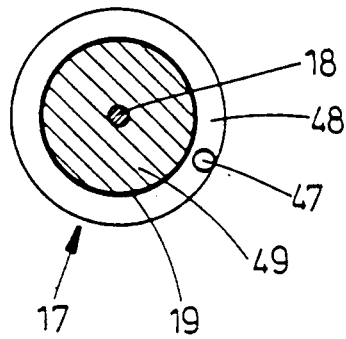
FIG. 3 shows a cross-section of a high-voltage cable in the circuit arrangement according to FIGS. 1 or 2.

Instead of the shield 19, it is also possible to use a separate connecting line 47 (FIG. 3) which is guided para·¹ to the high-voltage cable 17 to create the groun·² connection between control device 16 and trap 10. In a preferred embodiment illustrated in FIG. 3, this connecting line 47 is integrated in the high-voltage cable 17 itself and runs preferably in the insulated outer sleeve 48 of the high-voltage cable 17. As shown in the cross-section of the high-voltage cable 17 in FIG. 3, the high-voltage line 18, running through the middle in known manner, is separated from the shield 19 by a high-voltage insulation 49, which in turn is enclosed by the outer sleeve 48.

In a variation of the circuit arrangement in FIG. 1, instead of the resistor 25 it is also possible to connect a current source to the shield 19 of the high-voltage cable 17. An interruption in the shield 19 leads to a change of the output voltage of the current source, which is detected in the same manner by the voltage detection circuit 30.

The ground potential connected to the resistor 25 or to the voltage source can be replaced by any direct current potential.

We claim:

1. A safety circuit arrangement for an electrostatic filter including a housing connected as a counter-electrode to ground, means for passing exhaust gases through the housing, a filter electrode arranged in the housing, a high voltage generator including a power source, a primary winding connectable to a power source, and a secondary side having a secondary winding, and a shielded high-voltage cable including a high voltage line for connecting the secondary side to the filter electrode of the electrostatic filter and a shield surrounding the high voltage line and having opposite ends with one of the opposite ends being connected to the electrostatic filter housing, said safety circuit arrangement comprising a switching circuit having switching means for connecting the primary winding to the power supply; and control means for controlling said switching means, the shield having another of the opposite ends thereof connected to said control means, and said control means generating a switch-off signal in response to leakage currents in the high-voltage cable resulting from breaking at least one of the shield and the connection of the shield with the electrostatic filter housing and the filter housing to ground connection.

2. A safety circuit arrangement for an electrostatic filter including a housing connected as a counter-electrode to ground, means for passing exhaust gases through the housing, a filter electrode arranged in the housing, a high voltage generator including a power source, a primary winding connectable to a power source, and a secondary side having a secondary winding, and a shielded high-voltage cable including a high voltage line for connecting the secondary side to the filter electrode of the electrostatic filter and a shield surrounding the high voltage line and having opposite ends with one of the opposite ends being connected to the electrostatic filter housing and another of the opposite ends being connected to a direct current potential, said safety circuit arrangement comprising a resistor with which the another of the opposite ends of the shield is connected to the direct current potential; and a switching circuit having switching means for connecting the primary winding to the power supply, and control means for switching off said switching means in response to the voltage drop in said resistor resulting from breaking at least one of the shield and the connection of the shield with the electrostatic filter housing and the filter housing to ground connection.

3. A safety circuit arrangement as set forth in claim 2, wherein the direct current potential comprises ground means, and said control means includes a voltage detection circuit connected parallel to said resistor and generating a switch-off signal at its output in response to a predetermined voltage difference at its input.

4. A safety circuit arrangement as set forth in claim 3, wherein said switching means comprises a switching relay having a switching contact for connecting the primary winding to the power source, and a winding connected to the output of said voltage detection circuit.

5. A safety circuit arrangement for an electrostatic filter including a housing connected as a counter-electrode to ground, means for passing exhaust gases through the housing, a filter electrode arranged in the housing, a high voltage generator including a power source, a primary winding connectable to a power source, and a secondary side having a secondary winding and, and a shielded high-voltage cable including a high voltage line for connecting the secondary side to the filter electrode of the electrostatic filter and a shield surrounding the high voltage line and having opposite ends with one of the opposite ends being connected to the electrostatic filter housing, said safety circuit arrangement comprising a switching circuit including switching means for connecting the power source with one of the opposite ends of the primary winding; and a connection of the other of the opposite ends of the shield with another of the opposite ends of the primary winding whereby current flow through the primary winding is interrupted upon breaking of at least one of the shield and the connection of the shield with the electrostatic filter housing and the filter housing to ground connection.

6. A safety circuit arrangement as set forth in claim 5, wherein the power source is a power supply system of a vehicle, said switching means comprising a switching relay having a normally open switching contact serially connectable with the one of the opposite ends of the primary winding, and an excitation winding connectable to a power generator of the vehicle power supply system.

7. A safety circuit arrangement for an electrostatic filter including a housing connected as a counter-electrode to ground, means for passing exhaust gases through the housing, a filter electrode arranged in the housing, a high voltage generator including a power source, a primary winding connectable to a power source, and a secondary side having a secondary winding, a shielded high-voltage cable including a high voltage line for connecting the secondary side to the filter electrode of the electrostatic filter and a shield surrounding the high voltage line and having opposite ends with one of the opposite ends being connected to the electrostatic filter housing, said safety circuit arrangement comprising a switching circuit including switching means for connecting a power source with one of opposite ends of the the primary winding, and a connection of the other of the opposite ends of the shield with one of the switching circuit and another of the opposite ends of the primary winding whereby a flow of current through the primary winding is interrupted in response to the breaking of at least one of the shield and the connection of the shield to the electrostatic filter housing and the filter housing to ground connection.

8. An electrostatic filter assembly, comprising an electrostatic filter including a housing connected as a counterelectrode to ground, means for passing exhaust gases through said housing, a filter electrode arranged in said housing; a high voltage generator including a power source, a primary winding connectable to a power source, and a secondary side having a secondary winding, a shielded high-voltage cable including a high voltage line for connecting said secondary side to the filter electrode of the electrostatic filter and a shield surrounding the high voltage line and having opposite ends with one of said opposite ends being connected to said electrostatic filter housing; and a safety circuit arrangement comprising a switching circuit having switching means for connecting a power source with one of opposite ends of the primary winding, and a connection of the other of said opposite ends of said shield with one of said switching circuit and another of said opposite ends of said primary winding whereby a flow of current through said primary winding is interrupted in response to the breaking of at least one of said shield and the connection of said shield with said electrostatic filter housing and the filter housing to ground connection.

9. An electrostatic filter assembly as set forth in claim 8, wherein the connection of said shield with said electronic filter housing comprises a cable connector that provides for connection of said electronic filter housing to ground upon connection of said filter electrode to said high voltage line.

10. An electrostatic filter assembly as set forth in claim 8, wherein the connection of said shield with said electronic filter housing comprises a connector for connecting said high voltage line with said filter electrode, and a cap covering said connector, arranged in a spaced relationship with respect thereto, and connected to said one of said opposite ends of said shield in an electrically conductive manner, said cap being connectable with said housing in an electrically conductive manner upon connection of said high voltage line with said filter electrode.

11. An electrostatic filter assembly as set forth in claim 8, wherein said other of said opposite ends of said shield is connected to said another end of said primary winding, said secondary winding having two ends with one of the two ends being connected to said high-voltage line and another of said two ends being connected to ground.

12. An electrostatic filter assembly as set forth in claim 8, wherein said electrostatic filter comprises an electrostatic soot trap for diesel engines.

13. An electrostatic filter assembly as set forth in claim 8, wherein said shield has a connection line extending parallel to said high-voltage line and insulated therefrom.

14. An electrostatic filter assembly as set forth in claim 13, wherein said shield has an outer sheath, said connection line being integrated in said outer sheath.

15. An electrostatic filter assembly as set forth in claim 8, wherein said voltage generator includes a housing connected to ground.

* * * * *